US 12,494,825 B2

(12) United States Patent
Hoydis et al.

(10) Patent No.: US 12,494,825 B2
(45) Date of Patent: Dec. 9, 2025

(54) FREQUENCY DIVISION MULTIPLEXING WITH NEURAL NETWORKS IN RADIO COMMUNICATION SYSTEMS

(71) Applicant: NVIDIA Corporation, Santa Clara, CA (US)

(72) Inventors: Jakob Richard Hoydis, Paris (DE); Sebastian Cammerer, Tuebingen (DE); Alexander Keller, Berlin (DE); Fayçal Aït Aoudia, Saint-Cloud (FR)

(73) Assignee: NVIDIA Corporation, Santa Clara, CA (US)

( * ) Notice: Subject to any disclaimer, the term of this patent is extended or adjusted under 35 U.S.C. 154(b) by 174 days.

(21) Appl. No.: 18/233,203

(22) Filed: Aug. 11, 2023

(65) Prior Publication Data
US 2024/0097750 A1    Mar. 21, 2024

Related U.S. Application Data

(60) Provisional application No. 63/405,264, filed on Sep. 9, 2022.

(51) Int. Cl.
*H04L 1/02*    (2006.01)
*G06N 3/045*    (2023.01)
*G06N 3/084*    (2023.01)
*H04B 7/0452*    (2017.01)

(52) U.S. Cl.
CPC .......... *H04B 7/0452* (2013.01); *G06N 3/045* (2023.01); *G06N 3/084* (2013.01)

(58) Field of Classification Search
CPC .......... H04L 5/0055; H04L 27/26532; H04W 56/004; H04W 76/27; G05F 3/262; G05F 3/30; H04B 7/0452

USPC .......... 275/267, 260, 262; 375/267, 260, 262
See application file for complete search history.

(56) References Cited

U.S. PATENT DOCUMENTS

| | | | |
|---|---|---|---|
| 2020/0229206 A1* | 7/2020 | Badic | G05D 1/225 |
| 2021/0004038 A1* | 1/2021 | Lin | G05F 3/30 |
| 2022/0327134 A1* | 10/2022 | Tsoy | G06F 16/24578 |
| 2023/0057537 A1* | 2/2023 | Mappus | G06F 18/2113 |
| 2023/0262634 A1* | 8/2023 | Kim | H04W 56/0045 370/350 |
| 2024/0224287 A1* | 7/2024 | Kang | H04W 72/23 |

OTHER PUBLICATIONS

Convolutional Graph Neural Network for Multi-User OFDM MIMO Detection Fayçal Aït Aoudia, Jakob Hoydis, Sebastian Cammerer, and Alexander Keller, 13 pages, Aug. 9, 2022.

* cited by examiner

*Primary Examiner* — Khai Tran
(74) *Attorney, Agent, or Firm* — Lowenstein Sandler LLP

(57) ABSTRACT

Disclosed are apparatuses, systems, and techniques that may use machine learning for determining transmitted signals in communication systems that deploy orthogonal frequency division multiplexing. A system for performing the disclosed techniques includes receiving (RX) antennas to receive RX signals, each RX signal received over a respective resource element of a resource grid. Individual resource elements of the resource grid are associated with different radio subcarriers and/or data symbols. The RX signals include a combination of a plurality of transmitted (TX) streams. The system further includes a processing device to process the RX signals using one or more neural network models to determine TX data symbols transmitted via the plurality of TX streams.

21 Claims, 10 Drawing Sheets

FREQUENCY DIVISION MULTIPLEXING WITH NEURAL NETWORKS IN RADIO COMMUNICATION SYSTEMS

RELATED APPLICATIONS

This application claims the benefit of priority from U.S. Provisional Application No. 63/405,264 filed Sep. 9, 2022, which is incorporated herein by reference in its entirety.

TECHNICAL FIELD

At least one embodiment pertains to radio communication systems that deploy orthogonal frequency division multiplexing (OFDM). For example, at least one embodiment pertains to accurate data reconstruction using neural networks in multi-user OFDM communication systems.

BACKGROUND

In wireless transmissions that use OFDM, a bit stream is divided into multiple streams modulating different orthogonal frequency subcarriers $f$ that are then combined into a transmitted signal. A Discrete Fourier Transform is used on the receiving side to demodulate the subcarriers. Bits transmitted over individual subcarriers are grouped into symbols that are typically interspersed with guard intervals. The presence of guard intervals improves resilience of the wireless communications against echoes and interferences caused by signal propagation delays. Multiple input-multiple output (MIMO) technology increases capacity of radio communications by deploying multiple transmission and receiving antennas to exploit signal propagation over multiple distinct paths, which are engineered using interference-based beamforming techniques for directional transmission. In MIMO spatial multiplexing, individual signals are transmitted by a separate transmission (TX) antenna, received by receiver (RX) antenna(s), and combined by the RX device. Such combining is possible provided that the RX device has accurate channel state information (CSI) for radio signals arriving at an RX antenna array along different communication paths. CSI characterizes how a signal transmitted from a particular TX antenna is delayed, scattered, attenuated, etc., along a path to a given RX antenna. Multi-user MIMO (MU-MIMO) deploys MIMO technology for wireless communication, in which multiple users communicate with a base station in parallel using multiple TX and RX antennas.

DETAILED DESCRIPTION

Figure 1:
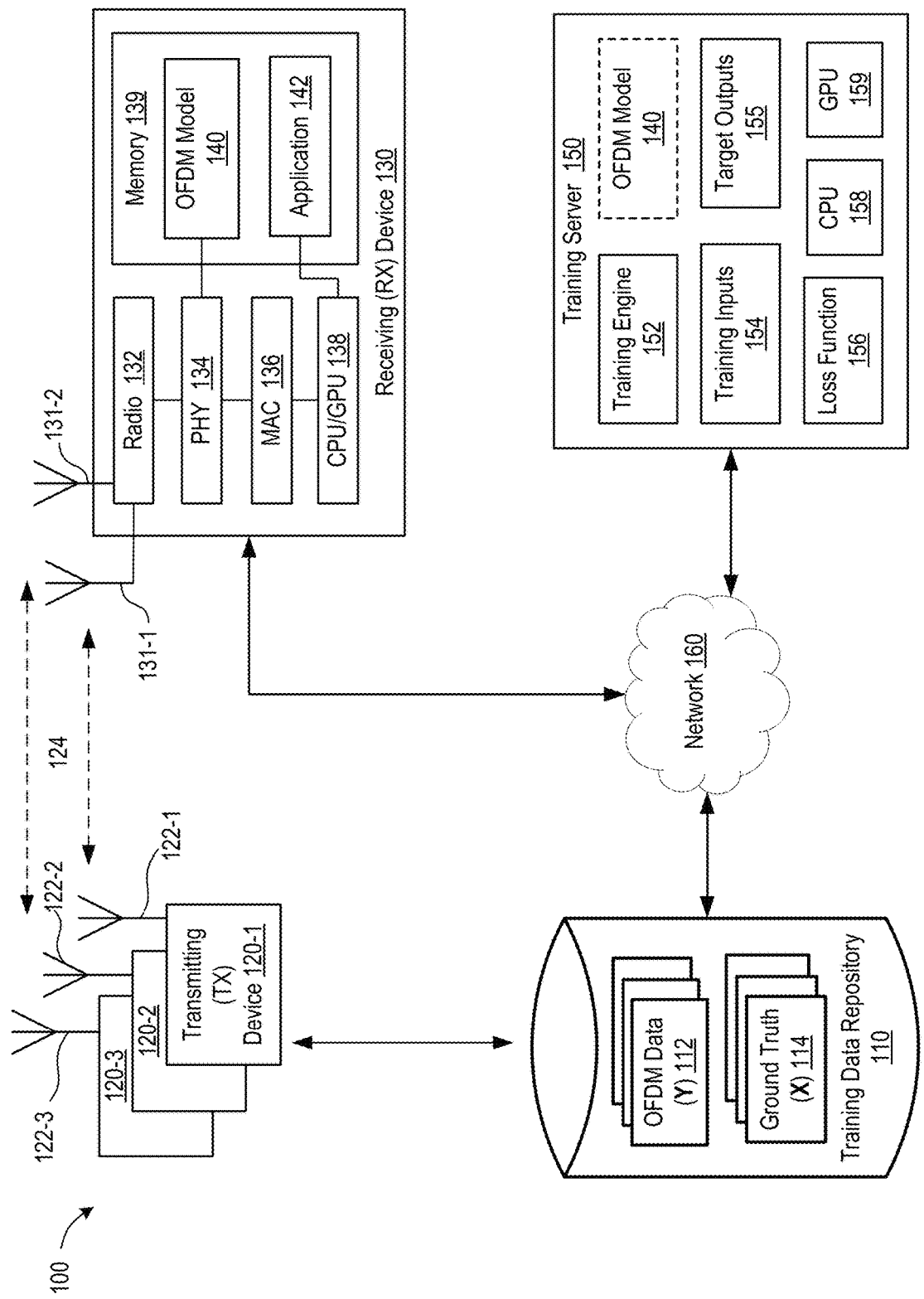
FIG. 1 is a block diagram of an example wireless communication system 100 that uses neural networks to implement multi-user MIMO OFDM operations, in accordance with at least some embodiments.

A MU-MIMO communication system deploying OFDM technology may include multiple TX antennas (which may be connected to a single or multiple devices) transmitting $N_T$ streams of data (e.g., $N_T$=2, 3, 4, 8, 12, 16 or any other number of TX streams) that are received by $N_R$ RX antennas. In some instances, a single TX stream may be transmitted by more than one antenna. In some instances, a single TX antenna may transmit more than one stream. The number of streams may change over time, between one and a maximum number of streams $N_{T\text{-}max}$ supported by the RX side. In some embodiments, the RX antennas may be connected to a single device or multiple devices that share computing resources, e.g., a protocol stack, and processor. Each stream may be transmitted over multiple $N_F$ frequency subcarriers (e.g., $N_F$=64, 256, 1024 or any other number of subcarriers). A group of $N_S$ symbols transmitted (over a certain time and evaluated jointly on the RX side) by the TX antennas over various frequency subcarriers is denoted herein as $\{X_{n_f n_s}(n_T)\}$ where index $n_f$ enumerates subcarriers ($1 \le n_f \le N_F$), index $n_S$ enumerates symbols ($1 \le n_S \le N_S$), and argument $n_T$ enumerates TX channels ($1 \le n_T \le N_T$). A given symbol X may be a vector that includes any number K of bits (e.g., K=2, 4, 8, 16, or any other number of bits). Vector X may be modulated to a predefined constellation and labeling, such as quadrature amplitude modulation (QAM) with Gray labeling, in one example. The $N_F \times N_S$ set of subcarriers and transmitted symbols is referred to as a resource grid herein, with a given element ($n_f$, $n_S$) of the resource grid referred to as a resource element (RE). The number $N_F$ of frequency subcarriers and the number $N_S$ of transmitted symbols may also vary with time.

A signal received over RE ($n_f$, $n_S$) via a particular $n_R$th antenna ($1 \le n_R \le N_R$) of $N_R$ RX antennas is denoted as $Y_{n_f n_s}(n_R)$. For illustration, the relation between the transmitted signals and the received signals may often be approximated with a good accuracy as a linear relation (although the embodiments and techniques of the present disclosure are not limited to linear systems), $$Y_{n_f,n_S}(n_R) = \sum_{n_T=1}^{N_T} H_{n_f,n_S}(n_R,n_T) \cdot X_{n_f,n_S}(n_T) + W_{n_f,n_S}(n_R),$$

where $H_{n_f,n_s}(n_R, n_T)$ is an $N_R \times N_T$ channel state matrix (defined separately for each resource element) that represents the CSI of the communication system, and $W_{n_f,n_s}(n_R)$ is an additive noise associated with radio wave propagation and reception. In some embodiments, the noise may be approximated as a white Gaussian noise and may further be approximated as being uncorrelated across different RX antennas and resource elements.

To identify transmitted signals $X_{n_f,n_s}(n_T)$ based on received signals $Y_{n_f,n_s}(n_R)$, existing techniques aim to determine the channel state matrix and apply this matrix (or its inverse) to the received signals. In most existing techniques, this process is performed in two stages. In the first stage, the channel state matrix $H_{n_f,n_s}(n_R, n_T)$ is estimated and, in the second stage, the inverse of the channel state matrix is applied to the received signals $Y_{n_f,n_s}(n_R)$. Channel state matrix estimation is typically performed using pilot REs. For example, as illustrated below in conjunction with FIG. 2, some of the REs may be reserved for transmission of predetermined (e.g., by the communication protocol) sequences of bits (vectors), $X_{pilots}(n_T)$, referred to as pilots. These known vectors $X_{pilots}(n_T)$ are used to estimate and extend (e.g., by interpolation and/or extrapolation) the channel state matrix to the entire resource grid. However, such extension is not always accurate, especially in systems with complex signal propagation and interference patterns. Moreover, such techniques often fail to account for intercarrier and/or intersymbol interference as well as various nonlinearities (e.g., hardware impairments) that may be present. Recent applications of neural networks (NNs) to CSI estimation have been successful in single-input multiple-output (SIMO) systems, enabling joint CSI estimation and transmitted signal reconstruction, but appear to be less accurate in MU-MIMO systems.

Aspects and embodiments of the present disclosure address these and other technological challenges by disclosing techniques and systems that use NNs, e.g., graph NNs (GNNs) that are combined with convolutional neuron layers, to achieve accurate joint CSI estimation and transmitted signal reconstruction for MU-MIMO OFDM systems. Convolutional NN techniques enable capturing channel matrix correlations across different subcarriers and symbols whereas the GNN structure of the networks allows operating with a flexible number of streams $N_T$, number of frequency subcarriers $N_F$, and/or the number of transmitted symbols $N_S$. In some embodiments, a set of tensors may be generated and then iteratively updated, using the disclosed OFDM model, to obtain progressively more accurate representation of CSI. The set of tensors may be initiated using RX signals and, in some embodiments, using positional encoding characterizing relative positioning of transmitted data symbols and pilot symbols and/or estimated (e.g., based on pilot received symbols) approximate channel state matrix.

Numerous other embodiments are described herein. The advantages of the disclosed techniques include but are not limited to a significantly lower block error rate (BLER) compared with conventional approaches.

System Architecture

FIG. 1 is a block diagram of an example wireless communication system 100 that uses neural networks to implement multi-user MIMO OFDM operations, in accordance with at least some embodiments. As depicted in FIG. 1, a computing system 100 may include a training data repository 110, one or more transmitting (TX) devices 120-$k$, a receiving (RX) device 130, a training server 150, and/or other devices not explicitly shown in FIG. 1. Although three TX devices 120-1, 120-2, and 120-3 are shown for concreteness, the number of TX devices 120-$k$ need not be limited. Training data repository 110, RX device 130, and training server 150 may be connected to a network 160. Network 160 may be a public network (e.g., the Internet), a private network (e.g., a local area network (LAN), or wide area network (WAN)), a wireless network, a personal area network (PAN), a mesh network, and/or a combination thereof. In some implementations, a local bus/interconnect can be used in lieu of network 160, e.g., a Peripheral Component Interconnect Express (PCIe) bus, an NVLink®, and/or the like. TX devices 120-$k$ and RX device 130 may be connected to a wireless (radio) communication channel 124. Wireless communication channel 124 may facilitate any suitable type of a wireless connection, including but not limited to wireless local area network (WLAN, e.g., Wi-Fi®) connection, a PAN (e.g., Bluetooth®) connection, a Long Term Evolution (LTE or 4G LTE) connection, a 5G connection, a mesh network (e.g., a BLE Mesh network, a Thread Mesh network, a ZigBee Mesh network, or any other type of a mesh network) connection, and/or the like. Each TX device 120-$k$ may use one or more TX antennas 122-$j$ for transmission of radio signals. (For conciseness and ease of viewing, each TX device 120-$k$ is shown using one TX antenna 122-$k$, although this is not a limitation).

RX device 130 may operate in accordance with a wireless protocol utilized by the respective wireless network, e.g., one of IEEE 802 protocols, and may support a single radio band (e.g., 2.4 GHz band) reception or multiple radio band reception (e.g., both 2.4 GHz and 5 GHz bands). RX device 130 may use multiple RX antennas 131-$k$(two RX antennas 131-1 and 131-2 are shown for simplicity but the number $N_R$ of RX antennas 131-$k$ need not be limited). Any of the antennas 131-$k$ may be capable of receiving and transmitting radio waves (although operations and techniques disclosed herein may be operating in conjunction with signals received by RX antennas 131-$k$).

A signal received by one or more RX antennas 131-$k$ may be processed by radio module 132, which may include filters (e.g., band-pass filters), low-noise radio-frequency amplifiers, down-conversion mixer(s), intermediate-frequency amplifiers, analog-to-digital converters, forward/inverse Fourier transform modules, deparsing modules, interleavers, error correction modules, scramblers, and other (analog and/or digital) circuitry that may be used to process modulated signals received by RX antennas 131-$k$. Although a single radio module 132 is shown supporting multiple RX antennas 131-$k$, in some embodiments, separate radio modules may support different RX antennas 112-$k$. Radio module 132 may digitize the received signals and provide the digital signals to a physical layer component (PHY) 134. PHY 134 may compute Fast Fourier Transforms, determine modulation carried by the digitized signals, perform error correction, and assemble received data into frames. MAC layer 136 may transform frames into data packets, which may be used by CPU 138 (or GPU, DPU, PPU, and/or the like) to support operations of any suitable application 142 that is instantiated in memory 139 of RX device 130. In some implementations, operations of OFDM model may be supported by an application-specific integrated circuit (ASIC), a field-programmable gate array (FPGA), and/or some other suitable accelerator.

PHY layer 134 may perform MU-MIMO signal $\{X_{n_fn_s}(n_T)\}$ reconstruction jointly with channel state estimation, e.g., using a trained OFDM model 140, as disclosed herein. In some embodiments, OFDM model 140 may have an architecture that is a combination of a convolutional NN (CNN) and a graph NN (GNN). A trained OFDM model 140 may process the received signals $\{Y_{n_fn_s}(n_R)\}$ together with certain pilot data (as disclosed in more detail below in conjunction with FIG. 3) and determine transmitted signals $\{X_{n_fn_s}(n_T)\}$. PHY layer 134 may then convert the transmitted signals into frames and provide the frames to MAC 136.

OFDM model 140 may be trained by a training server 150 using appropriate training data. In some embodiments, the training data may be stored in training data repository 110, including various OFDM data 112, e.g., training RX signals $\{Y_{n_fn_s}(n_R)\}$, and ground truth 114, e.g., training TX signals $\{X_{n_fn_s}(n_T)\}$. In some embodiments, training data repository 110 may be a persistent storage capable of storing OFDM data 112 and ground truth 114 in any acceptable format. Training data repository 110 may be hosted by one or more storage devices, such as main memory, magnetic or optical storage disks, tapes, or hard drives, network-attached storage (NAS), storage area network (SAN), and so forth. Although depicted as separate from training server 150, in at least one embodiment, training data repository 110 may be a part of training server 150. In at least some embodiments, training data repository 110 may be a network-attached file server, while in other embodiments training data repository 110 may be some other type of persistent storage, such as an object-oriented database, a relational database, and so forth, that may be hosted by one or more other machines coupled to training server 150 via network 160.

Training server 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. Training server 150 may deploy a training engine 152 to train OFDM model 140 using training data that includes training inputs 154 and corresponding target outputs 155. As described in more detail below, OFDM model 140 may include one or more deep neural networks, with one or more hidden layers, e.g., convolutional neural networks, recurrent neural networks (RNN), and fully connected neural networks. Neurons of OFDM model 140 may receive inputs from other neurons or from an external source and may produce an output by computing a sum of weighted inputs and a bias value (and, optionally, subject to an activation function). In one illustrative example, weights and biases may initially be assigned random values that are modified during training.

Training inputs 154 may include sets of received signals $\{Y_{n_fn_s}(n_R)\}$ and target outputs 155 may include sets of transmitted signals $\{X_{n_fn_s}(n_T)\}$. Training engine 152 may find patterns in the training data that map the training inputs to the target outputs (the desired result to be predicted), and train OFDM model 140 to capture these patterns. Differences between training inputs, e.g., predicted signals $\{\tilde{X}_{n_fn_s}(n_T)\}$, and ground truth signals $\{X_{n_fn_s}(n_T)\}$ may be quantified using a suitable loss function 156, e.g., a binary cross-entropy loss function or some other loss function. The quantified differences may be backpropagated through OFDM model 140 and various parameters (e.g., weights and biases) of OFDM model 140 may be adjusted to reduce the differences. This adjustment may be repeated until the error for a particular training input 154 satisfies a predetermined condition (e.g., falls below a predetermined error). Subsequently, a different training input 152 may be selected, a new output generated, and a new series of adjustments implemented, and so on, until OFDM model 140 is trained to a desired degree of accuracy. After OFDM model 140 is trained, the trained OFDM model 140 may be provided to RX device 130 for inference analysis of new OFDM data. For example, PHY 134 of RX device 130 may receive a new (runtime) set of signals $\{Y_{n_fn_s}(n_R)\}$ from radio module 132 and use the trained OFDM model 140 to identify a correct set of transmitted signals $\{X_{n_fn_s}(n_T)\}$ based on the received signals $\{Y_{n_fn_s}(n_R)\}$.

Training server 150 may include a memory (not shown in FIG. 1) communicatively coupled to one or more processing devices, such as one or more central processing units (CPU) 158 and/or one or more graphics processing units (GPU) 159, data processing units (DPUs), parallel processing units (PPUs), and/or the like. Training server 150 may store executable codes, libraries, and various dependencies of training engine 152. Training engine 152 may be executed by CPU 158, GPU 159, or both. In at least one embodiment, GPU 159 may include multiple cores, each core being capable of executing multiple GPU threads. Each core may run multiple threads concurrently (e.g., in parallel). In at least one embodiment, threads may have access to registers. Some or all cores may include a scheduler to distribute computational tasks and processes among different threads of the respective core. A dispatch unit may implement scheduled tasks on appropriate threads using various private registers and shared registers. In at least one embodiment, GPU 159 may have a (high-speed) cache, access to which may be shared by multiple cores. Furthermore, GPU 159 may include a GPU memory to store intermediate and/or final results (outputs) of various computations performed by GPU 159. In some embodiments, training engine 152 may determine which processes are to be executed on GPU 158 and which processes are to be executed on CPU 159.

OFDM Model Architecture

Figure 2:
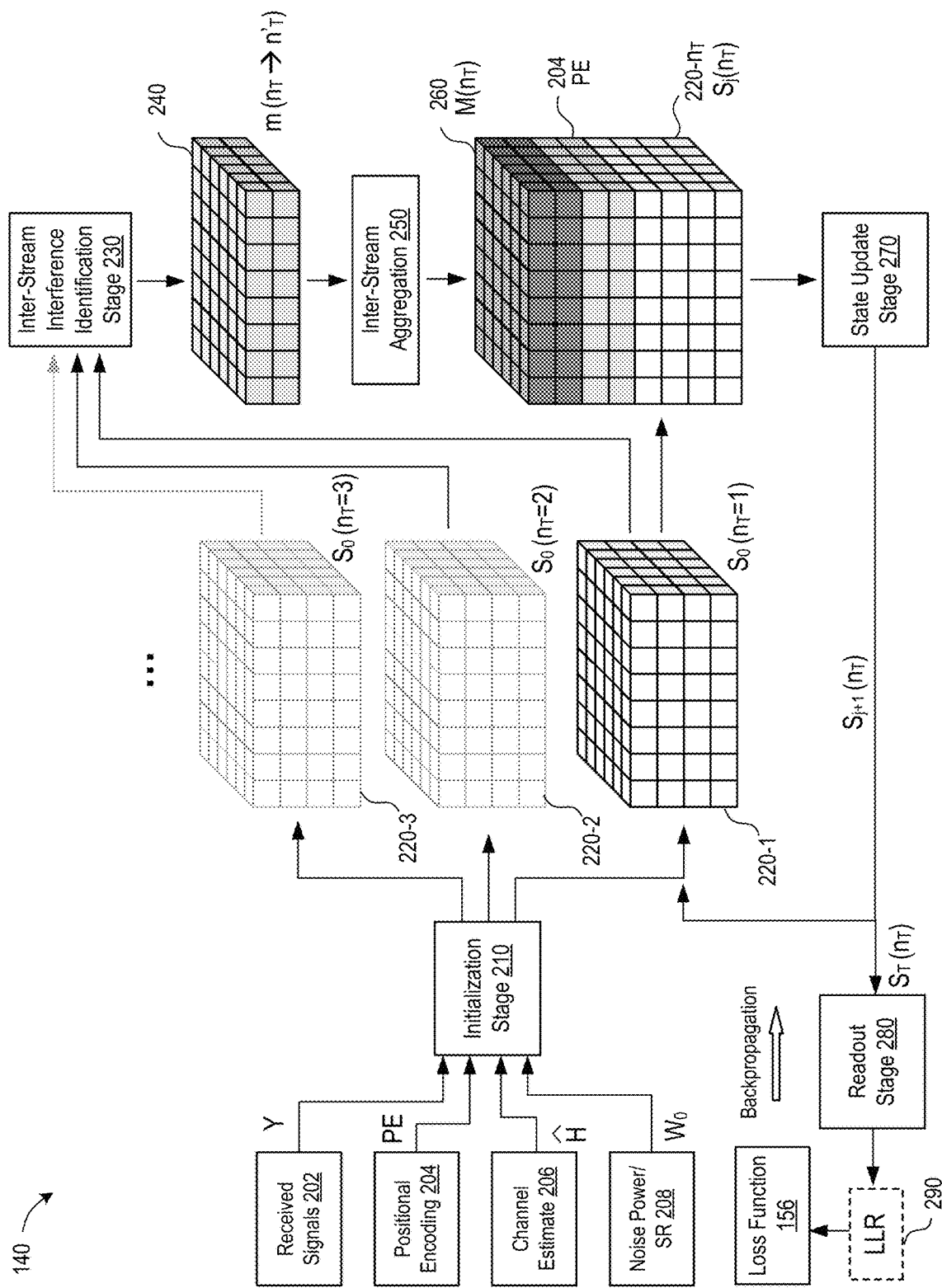
FIG. 2 illustrates an example neural network architecture of an OFDM model capable of supporting MIMO OFDM operations, according to at least one embodiment.

FIG. 2 illustrates an example neural network architecture of an OFDM model 140 capable of supporting MIMO OFDM operations, according to at least one embodiment. In at least one embodiment, example NN architecture illustrated in FIG. 2 may be implemented, during the training stage of OFDM model 140, by training server 150. Since operations of OFDM model 140 during the training stage and the inference stage may be similar, with certain exceptions, the techniques disclosed in conjunction with FIG. 2 may be applicable to both stages. The exceptions may be related to use of a loss function, dropout of neurons (e.g., random neuron dropout to prevent overfitting), and/or other techniques that may be used during the training stage and not used during the inference stage.

As illustrated in FIG. 2, received signals $\{Y_{n_fn_s}(n_R)\}$ may be processed by an initialization stage 210, which may be implemented as a subnetwork of OFDM model 140. Initialization stage 210 converts K-bit received vectors $Y_{n_fn_s}(n_R)$ into d-bit feature (encoding) vectors associated with $N_T$ streams, e.g., $N_R$ complex-valued vectors $Y_{n_fn_s}(n_R)$, or $2N_R$ real-valued vectors. A separate feature vector may be output for separate REs ($n_f$, $n_s$) and separate transmitted streams $n_T$. As a result, the output of initialization stage 210 may include $N_T$ state tensors $S_{0n_fn_s}(n_T)$, denoted as $S_0(n_T)$ herein, jointly characterizing the (initial, as indicated by the subscript 0) state of the communication channel. Each state tensor has dimensions $N_F \times N_S \times d$. For concreteness and illustration, FIG. 2 depicts schematically three initial state tensors: state tensor $S_0(n_T=1)$ 221, state tensor $S_0(n_T=2)$ 222, and state tensor $S_0(n_T=3)$ 223.

Figure 3:
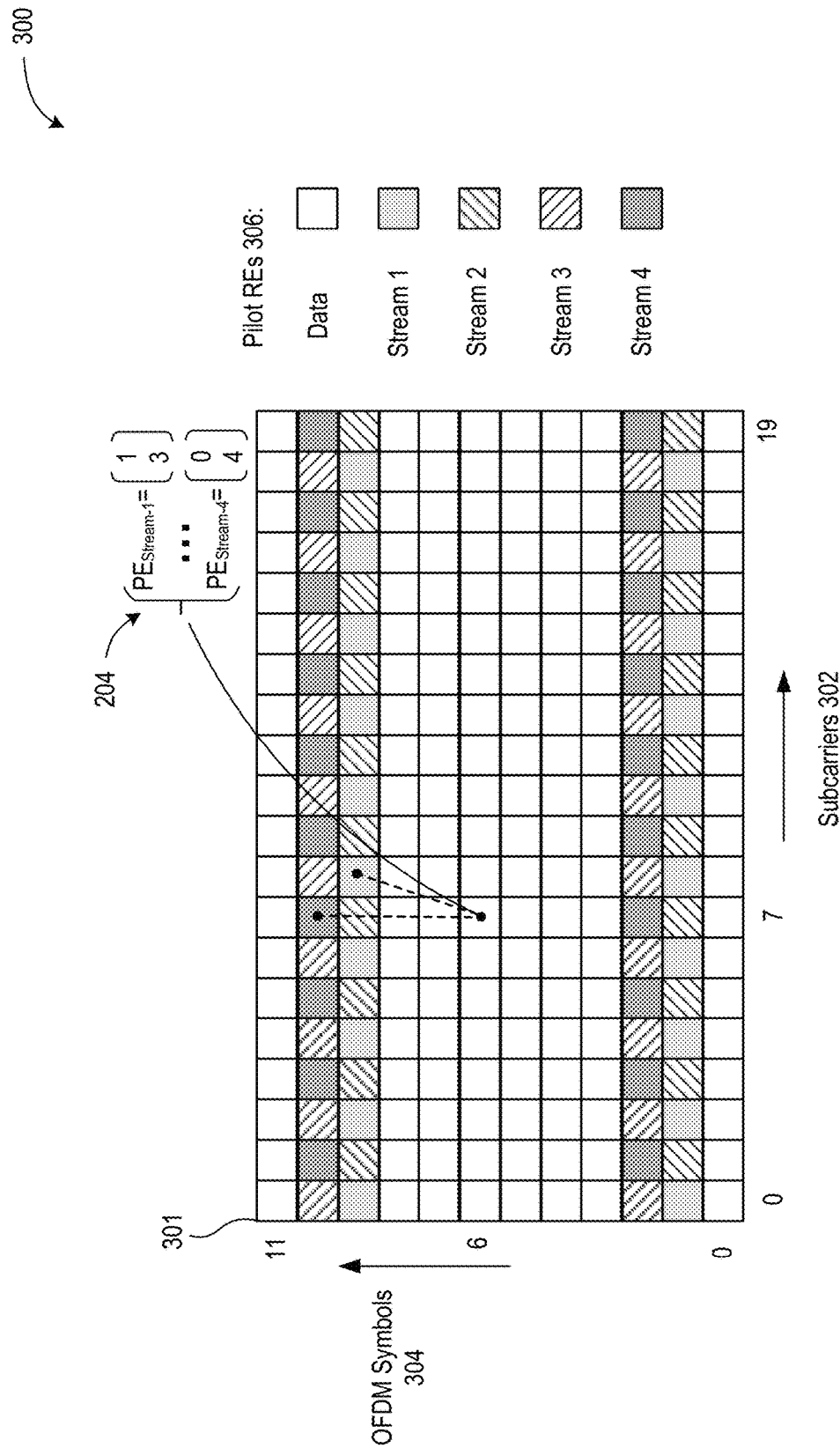
FIG. 3 illustrates one example construction of a positional encoding that may be used by the OFDM model, according to at least one embodiment.

Initialization stage 210 may also use, as inputs, various additional data. In some embodiments, the inputs into initialization stage 210 may include positional encoding 204. FIG. 3 illustrates one example construction 300 of positional encoding 204 that may be used by OFDM model 140, according to at least one embodiment. Positional encoding 204 may characterize proximity of various REs (depicted as squares in FIG. 3) of resource grid 301 to pilot REs. Illustrated in FIG. 3 is a resource grid (or a portion of a larger resource grid) with 20 subcarriers and 12 OFDM symbols. White squares indicate REs used for data transmission and squares of various shadings indicate example pilot REs 306 (four streams are illustrated, for concreteness). A given pilot RE may be reserved to one of the streams, such that during transmission of a corresponding symbol, the respective TX antenna transmits a known sequence of bits while other antennas are not transmitting. As a result, pilot REs 306 may serve as carriers of reference data that is representative of the CSI of the system. Positional encoding 204 may be defined for each RE (or each data RE) and may include, e.g., (1) a distance (in RE units) from the respective RE to the closest pilot RE of individual streams along the subcarrier dimension of the resource grid, (2) a distance from the RE to the closest pilot RE of individual streams along the OFDM symbol dimension, and/or the like. For example, RE (7,6) may be characterized by the PE vector for the first stream (indicated as $PE_{Stream-1}$ in FIG. 3) with two components, 1 and 3, indicating that the distance from the closest pilot RE for the first stream (8,9) is one along the subcarrier dimension and is three along the OFDM symbol dimension. PE vectors for other streams may be constructed in a similar manner. For example, the same RE (7,6) may be characterized by the PE vector for the fourth stream (indicated as $PE_{Stream-4}$) with components 0 and 4, indicating that the distance from the closest pilot RE for the first stream (7,10) is zero along the subcarrier dimension and is four along the OFDM symbol dimension.

In some embodiments, the positional encoding vectors may be agnostic about the signs of distances. In some embodiments, the positional encoding vectors may include signs. For example, a distance (along any dimension) may be taken with a positive sign provided that the pilot RE has a higher subcarrier number or a symbol number than the data RE and taken with a negative sign otherwise (or vice versa). In those instances where multiple pilot PEs are located at the same distance from a data RE, any suitable sign convention may be used for distance disambiguation. For example, as pilot RE (8,9) is located at positive distance+1 from data RE (7,6) along the subcarrier dimension whereas as another pilot RE (6,9) is located at equal but negative distance −1 from the same data RE (7,6), a sign convention may select the positive sign distance over the negative sign distance (or vice versa) for the data RE (7,6). With each positional encoding vector having dimension 2, positional encoding 204 may have dimensions $N_F \times N_S \times 2$ for each of $N_T$ transmitted streams.

In some embodiments, multiple pilot REs may be included in the positional encodings of various REs. For example, distances to two, three, etc., closest pilot REs may be included in positional encoding 204 of a given data RE. Correspondingly, the dimensions of positional encoding tensors may be $N_F \times N_S \times 4$, $N_F \times N_S \times 6$, etc., for each of the $N_T$ transmitted streams.

Referring again to FIG. 2, additional inputs into initialization stage 210 may include a channel estimate 206 and/or noise power 208. Channel estimate 206 may include an estimated value $\hat{H}_{n_f,n_s}(n_R, n_T)$ of channel matrix that is estimated using pilot signals $p_{n_f,n_s}(n_T)$ transmitted with stream ($n_T$) over RE ($n_f$, $n_s$) and detected by RX antenna $n_R$ as the received signals $y_{n_f,n_s}(n_R)$. For example, the least square estimate gives the following channel estimate 206, $$\hat{H}_{n_f,n_S}(n_R, n_T) = \frac{y_{n_f,n_S}(n_R) p^*_{n_f,n_S}(n_T)}{\left|p_{n_f,n_S}(n_T)\right|^2}.$$

Using channel estimate 206 $\hat{H}_{n_f,n_s}(n_R, n_T)$ as input into initialization stage 210 has been shown experimentally to improve performance of OFDM model 140, serving as a bootstrap for channel estimation. Computations performed by OFDM model 140 improve this estimate, $H_{n_f,n_s}(n_R, n_T) \rightarrow H_{n_f,n_s}(n_R, n_T)$, by exploiting the subcarrier-symbol correlations of the channel matrix coefficients in the course of joint channel estimation and data detection for accurate reconstruction of the transmitted messages. Channel estimate $\hat{H}_{n_f,n_s}(n_R, n_T)$ is a complex tensor of dimensions $N_F \times N_S \times N_R$ for each of $N_T$ transmitted channels.

Noise power estimate $W_{n_f,n_s}(n_R)$ 208 may be a tensor of dimensions $N_F \times N_S \times N_R$ with elements that may be set equal to the same value $W_0$. The noise power $W_0$ may be a real number measured in decibels with the logarithmic scale used to facilitate operations over large ranges of signal-to-noise ratio (SNR). In some embodiments, the noise power $W_0$ may be estimated using signals received at unused REs, which are not associated with any streams and are, therefore, representative of the noise in the system.

Figures 4A, 4B:
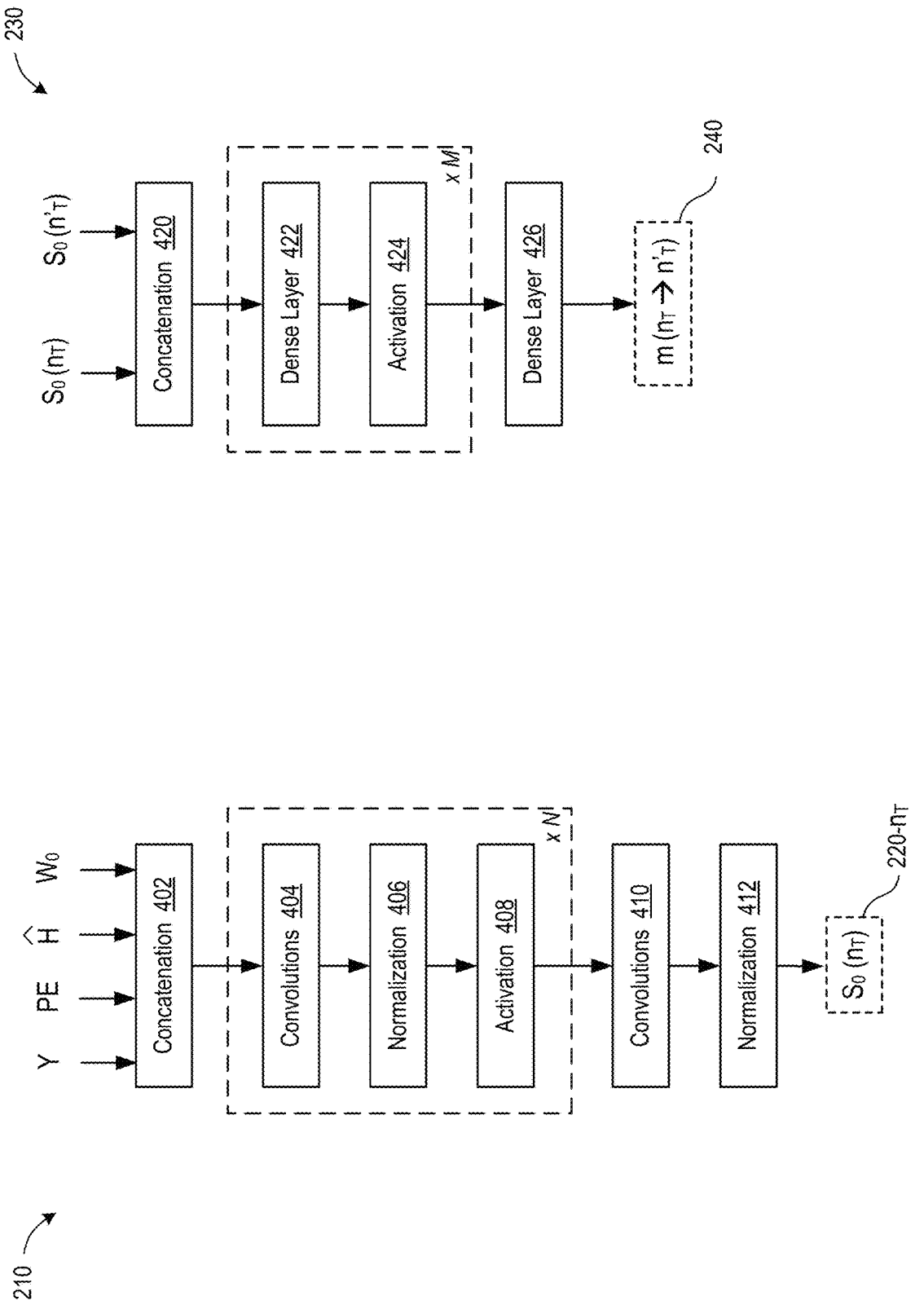
FIG. 4A illustrates an example architecture of an initialization stage of the OFDM model of FIG. 2, according to at least one embodiment.
FIG. 4B illustrates an example architecture of a inter-stream interference identification stage of the OFDM model of FIG. 2, according to at least one embodiment

FIG. 4A illustrates an example architecture of the initialization stage 210 of OFDM model 140 of FIG. 2, according to at least one embodiment. In some embodiments, as illustrated in FIG. 4A, initialization stage 210 may use convolution techniques. The inputs to initialization stage 210, e.g., received signals (Y), positional encoding (PE), channel estimate ($\hat{H}$), noise power estimate ($W_0$), may undergo concatenation 402. Real and imaginary parts of complex-valued inputs (e.g., Y and $\hat{H}$) may be extracted and concatenated. Concatenated inputs may undergo one or more blocks of neural operations, each block including a layer of convolutions 404, an optional layer of normalization 406 (e.g., layer normalizations or batch normalizations), and an activation layer 408. Convolutions 404 may be separable convolutions used to reduce complexity of the inputs. Convolutions 404 may apply kernels (filters) of dimensions 3×3, 4×4, or some other suitable dimension. The number of kernels may be 64, 256, 512, or some other number. Activation layer 408 may deploy a rectified linear unit function (ReLU) or some other activation function. Blocks of layers 404-408 may be repeated N=2, 3, etc., or some other number of times followed by another layer of convolutions 410 (e.g., separable convolutions) and normalization 412. The layer of convolutions 410 may use d filters, where d is the feature dimension of the output state tensor $S_0(n_T)$220–$n_T$. Initialization stage 210 may be applied $N_T$ times, once for each transmitted stream. In some embodiments, the received signals Y and noise power estimate $W_0$ inputs into initialization stage 210 may be the same for all streams while positional encoding PE and channel estimate H may be stream-specific, e.g., as disclosed above in conjunction with FIG. 2. The $N_F \times N_S \times d$ output state tensor $S_0(n_T)$ carries channel information together with data transmitted by the TX stream $n_T$.

Referring to FIG. 2, state tensors 220-1, 220-2, 220-3, etc., may be processed by a inter-stream interference identification stage 230, provided that $N_T > 1$ (No inter-stream interference identification stage is used if $N_T=1$). Inter-stream interference identification stage 230 may process pairs of state tensors 220-$x$ to generate inter-stream interference features $m_{n_f,n_s}(n_T \to n'_T)$ for $N_T(N_T-1)/2$ pairs $n_T$, $n'_T$ of transmitted streams. FIG. 4B illustrates an example architecture of the inter-stream interference identification stage 230 of OFDM model 140 of FIG. 2, according to at least one embodiment. In some embodiments, as illustrated in FIG. 4B, inter-stream interference identification stage 230 may use one or more dense (fully-connected) layers. The inputs to inter-stream interference identification stage 230 may include pairs of state tensors $S_0(n_T)$ and $S_0(n'_T)$ that undergo concatenation 420. Concatenated inputs may be processed using one or more blocks of neural operations, each block including a dense layer 422 and an activation layer 424. Activation layer 424 may deploy ReLU function or some other suitable activation function. Blocks of layers 422-424 may be repeated M=2, 3, etc., or some other number of times followed by another dense layer 426. In some embodiments, dense layer(s) 422 may have 256 neurons whereas the final dense layer 426 may have $d_M$ neurons (e.g., $d_M$=64 or some other number), which may also be the size of the inter-stream interference feature output $m_{n_f,n_s}(n_T \to n_T)$ 240 of the inter-stream interference identification stage 230. The $d_M$-dimensional feature vector $m_{n_f,n_s}(n_T \to n_T')$ may be computed for each RE of the resource grid and each pair of the transmitted streams, e.g., sequentially, using one instance of the inter-stream interference identification stage 230, or in parallel, using two or more instances of the inter-stream interference identification stage 230. The inter-stream interference feature output 240 carries information about interference between a respective pair of transmitted channels $n_T$, $n'_T$. In some embodiments, inter-stream interference identification stage 230 may be replaced (or augmented) with a self-attention processing.

With a continuing reference to FIG. 2, a inter-stream interference aggregation function 250 may combine inter-stream interference feature outputs 240, obtained for a given transmission stream $n_T$ and various other transmission streams $n'_T$. In some embodiments, the aggregation may be performed by averaging individual inter-stream interference features, $$M_{n_f,n_S}(n_T) = \frac{1}{N_T-1} \sum_{n'_T \ne n_T} m_{n_f,n_S}(n_T \to n'_T).$$

In some embodiments, other types of aggregation may be performed, such as computing a geometric mean of individual inter-stream interference features or using some other permutation-invariant aggregation function. The aggregated inter-stream interference tensor 260 may have dimensions $N_F \times N_S \times d_M$.

Figures 5A, 5B:
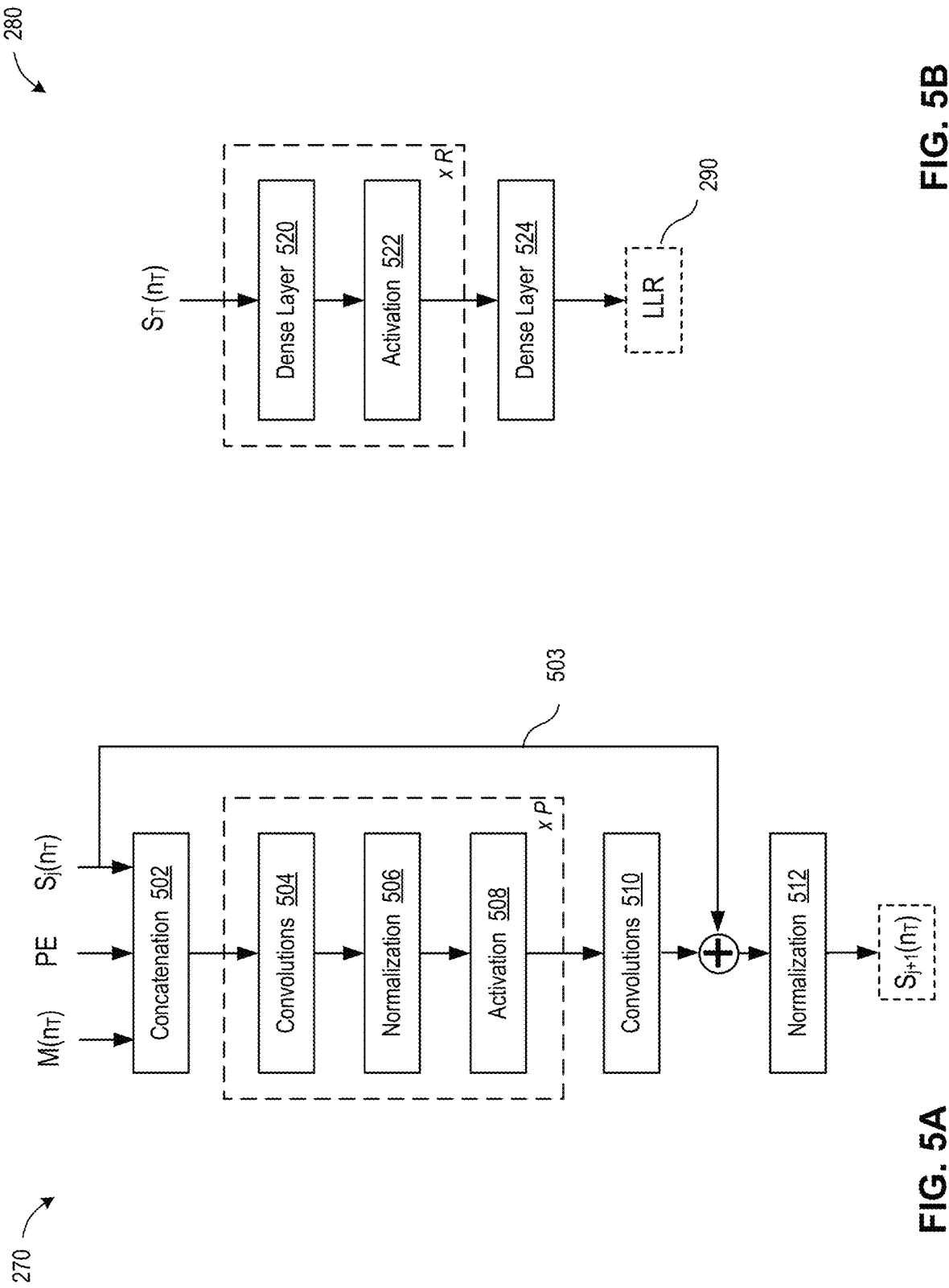
FIG. 5A illustrates an example architecture of a state update stage of the OFDM model of FIG. 2, according to at least one embodiment.
FIG. 5B illustrates an example architecture of a readout stage of the OFDM model of FIG. 2, according to at least one embodiment.

The aggregated inter-stream interference tensor $M_{n_f,n_s}(n_T)$ 260 may be combined with a respective state tensor $S_0(n_T)$ 220-$n_T$ and processed by state update stage 270, which updates the state tensor $S_0(n_T) \to S_1(n_T)$ (and similarly during later iterations, $S_j(n_T) \to S_{j+1}(n_T)$). An additional input into state update stage 270 may include a copy of positional encoding 204. FIG. 5A illustrates an example architecture of state update stage 270 of OFDM model 140 of FIG. 2, according to at least one embodiment. In some embodiments, as illustrated in FIG. 5A, state update stage 270 may use convolution techniques. The inputs to state update stage 270, e.g., inter-stream interference tensor $M(n_T)$, positional encoding (PE), and state tensor $S_0(n_T)$ (or $S_j(n_T)$ in later iterations) may undergo concatenation 502. Concatenated inputs may then undergo one or more blocks of neural operations, each block including a layer of convolutions 504, a layer of normalization 506, and an activation layer 508. Convolutions 504 may be separable convolutions used to reduce complexity of the inputs. Convolutions 504 may apply kernels (filters) of dimensions 3×3, 4×4, or some other dimension. The number of kernels may be 256, 512, or some other number. Activation layer 508 may deploy ReLU function or some other activation function. Blocks of layers 404-408 may be repeated P=2, 3, etc., times or some other number of times followed by another layer of convolutions 510 (e.g., separable convolutions) and normalization 512. The layer of convolutions 510 may use d filters, where d is the feature dimension of the updated state tensor $S_1(n_T)$ (or $S_{j+1}(n_T)$ in later iterations). In some embodiments, state update stage 270 may deploy a skip connection 503 that adds the initial state tensor $S_0(n_T)$ (or, $S_j(n_T)$, for later iterations) to the output of the layer of convolutions 510. This enables addressing the gradient vanishing problem during training of the OFDM model. State update stage 270 may be applied $N_T$ times, once for each transmitted stream, and enables exploring subcarrier-symbol correlation of channel coefficients while taking into account inter-stream interference via the inter-stream interference tensor. The $N_F \times N_S \times d$ output state tensor $S_1(n_T)$ (or $S_{j+1}(n_T)$ in later iterations) carries channel information together with data transmitted by the TX stream $n_T$.

With a continued reference to FIG. 2, operations of inter-stream interference identification stage 230, inter-stream interference aggregation 250, and state update stage 270 may be performed for multiple, T, iterations, e.g., T=2, 3, 6, 10 iterations, or some other empirically determined number of times. In some embodiments, number T of iterations may be determined dynamically. For example, further iterations may be stopped once the set of state tensors $\{S_j(n_T)\}$ output by the most recent iteration differs from the output of the preceding iteration $\{S_{j-1}(n_T)\}$ by an amount that is below a target threshold, e.g., once an average relative change of the state tensor elements (across different streams and REs) falls below a certain empirically set value, e.g., 1%, 2%, 5%, and/or the like.

Once the last (Tth) iteration has been performed, the output $S_T(n_T)$ of the state update stage 270 of the last iteration may be input into a readout stage 280 to obtain a vector $\hat{X}_{n_f,n_s}(n_T)$ that represents a reconstruction of the transmitted vector $X_{n_f,n_s}(n_T)$ or a reconstruction of K bits assigned to symbol X transmitted via stream $n_T$ over each RE ($n_f$, $n_s$) of the resource grid. In some implementations, the output of the readout stage may include probabilities $p_0$ and $p_1=1-p_0$ of various bit values (0 and 1) of vector $\hat{X}_{n_f,n_s}(n_T)$; a bit value with the largest probability may be selected while the specific values $p_0$ and $p_1$ may be treated as confidence levels of reconstruction of the respective bits values.

FIG. 5B illustrates an example architecture of the readout stage 280 of OFDM model 140 of FIG. 2, according to at least one embodiment. In some embodiments, as illustrated in FIG. 5B, readout stage 280 may deploy one or more dense (fully-connected) layers. The input to readout stage 280, the final state tensor $S_T(n_T)$, may be processed using one or more blocks of neural operations, each block including a dense layer 520 and an activation layer 522. Activation layer 522 may deploy ReLU function or some other suitable activation function. Blocks of layers 520-522 may be repeated R=2, 3, etc., or some other number of times followed by another dense layer 524. In some embodiments, dense layer(s) 520 may have 256 neurons whereas the final dense layer 524 may have K neurons (the number of bits in each symbol). The final dense layer 524 may output log-likelihood ratios (LLR) 290 of probabilities of different bits of a given symbol. The log-likelihood ratios 290 may then be used to identify the most probable bit values of transmitted symbols and the confidence levels for the identified bits.

Various additional embodiments are within the scope of the instant disclosure. The architecture and training techniques for the OFDM model may be used with multiple modulation schemes. In some embodiments, inputs into the OFDM model omit some of the inputs disclosed in conjunction with FIGS. 2-5. For example, channel state estimate 206 may be omitted to force the OFDM model to learn (and use in inference) how to determine channel state information directly from received signals 202 and positional encoding 204. In such embodiments, the number T of the performed state update iterations may be increased compared with embodiments that deploy the channel state estimates.

In some embodiments, training of the OFDM model may be performed for a certain number of transmitted streams $N_T$, subcarriers $N_F$, and/or OFDM symbols $N_S$, whereas the trained OFDM model may be used with a different number of transmitted streams, subcarriers, and/or OFDM symbols. In some embodiments, training may be performed using training data for multiple different numbers of the transmitted streams. In those instances where the number of streams $N_T$ is variable, normalization operations performed by various NN stages of the OFDM model, e.g., as illustrated in conjunction with FIGS. 4-5, may be layer normalizations rather than batch normalizations, to avoid constraints associated with training sets in a batch having the same number of transmitted streams.

During training, a suitably chosen loss function 156 may be deployed to evaluate probabilities $p_1$ and $p_0$ output by readout stage 280 and compare the probabilities to ground truth labels $x_1$ and $x_0$ for the corresponding bits (e.g., where $x_1=1$, $x_0=0$, when the bit has value 1, and $x_1=0$, $x_0=1$, when the bit has value 0), such as the binary cross entropy (BCE) loss function 156, $$BCE = -\frac{1}{N_0} \sum (x_1 \log p_1 + x_0 \log p_0),$$

where the sum is taken over $N_0$ bits of a training input, e.g., $N_T \times N_F \times N_S \times K$ bits (minus pilot bits). The computed values of loss function 156 may be used in various techniques of backpropagation, gradient descent, and/or the like, that modify various parameters of OFDM 140 (and, in particular, initialization stage 210, inter-stream interference identification stage 230, state update stage 270, and/or readout stage 280) in a direction that reduces the loss function value. In some embodiments, during training, the readout stage 280 may be applied after every iteration of OFDM model 140 (as disclosed in conjunction with FIG. 2) and used to update the loss function, e.g., calculate the mean loss over all iterations. Such aggregation of the loss function over different iterations may have an advantage of improving stability of the training process. In some embodiments, OFDM model 140 may be trained using a known set of TX data symbols, e.g., generated by training engine 152 (FIG. 1). In some embodiments, OFDM model 140 may be trained using an unknown set of TX data symbols. For example, ground truth labels, which are used during training, may be obtained by using one or more maximum-likelihood receiver algorithms (so that no prior knowledge of TX symbols is required). In some embodiments, forward error correction codes may be used to correct errors in the reconstructed ground truth labels.

Figure 6:
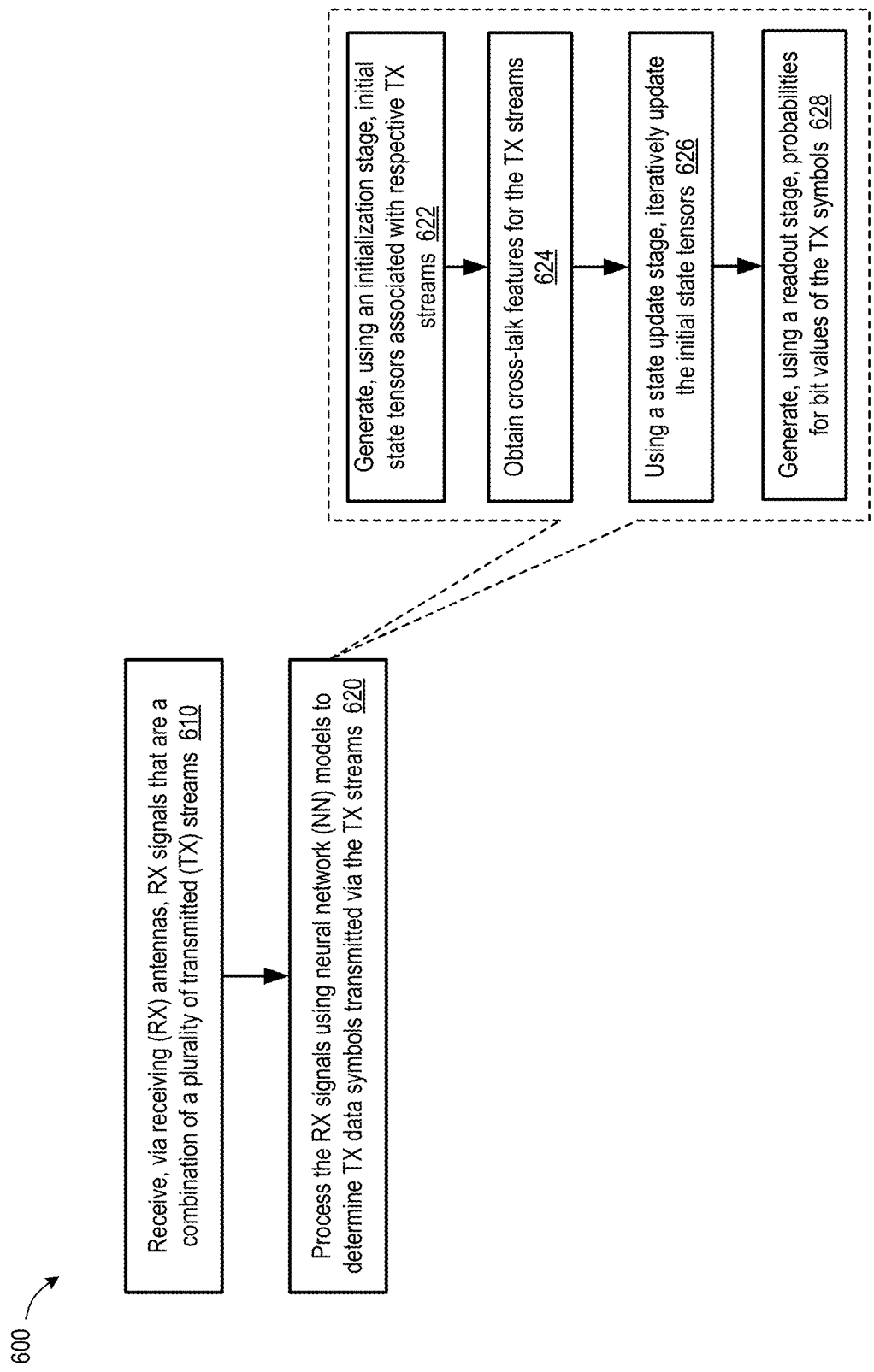
FIG. 6 is a flow diagram of example method of using neural network models for transmitted signal determination in communication systems that deploy orthogonal frequency division multiplexing, according to some embodiments of the present disclosure.

FIG. 6 is a flow diagram of example method 600 of using neural network models for transmitted signal determination in communication systems that deploy orthogonal frequency division multiplexing, according to some embodiments of the present disclosure. Method 600 may be performed by one or more processing units (e.g., CPUs and/or GPUs), which may include (or communicate with) one or more memory devices. In at least one embodiment, method 600 may be performed by processing units of receiving device 130 and/or training server 150 in FIG. 1. In at least one embodiment, processing units performing method 600 may be executing instructions stored on a non-transient computer-readable storage media. In at least one embodiment, method 600 may be performed by multiple processing threads (e.g., CPU threads and/or GPU threads), each thread executing one or more individual functions, routines, subroutines, or operations of the method. In at least one embodiment, processing threads implementing method 600 may be synchronized (e.g., using semaphores, critical sections, and/or other thread synchronization mechanisms). Alternatively, processing threads implementing method 600 may be executed asynchronously with respect to each other. Various operations of method 600 may be performed in a different order compared with the order shown in FIG. 6. Some operations of method 600 may be performed concurrently with other operations. In at least one embodiment, one or more operations shown in FIG. 6 may not always be performed.

At block 610, a receiving device performing method 600 may receive, via a plurality of RX antennas (e.g., antennas 131-$x$ in FIG. 1), a plurality of RX signals (e.g., signals $Y_{n_f,n_s}(n_R)$). Each RX signal may be received over a respective resource element (RE) ($n_f$, $n_s$) of a resource grid. Individual REs of the resource grid may be associated with different radio frequency subcarriers $n_f$ and/or data symbols $n_S$. The plurality of RX signals may be a combination (e.g., a superposition, in the instances of linear transmission/reception) of a plurality of transmitted (TX) streams (e.g., carrying signals $X_{n_f,n_s}(n_T)$).

At block 620, method 600 may continue with processing units of the receiving device processing the plurality of RX signals using one or more NN models to determine a plurality of TX data symbols transmitted via the plurality of TX streams. In some embodiments, the plurality of TX data symbols may include a plurality of TX pilot symbols transmitted at predetermined RE positions of the resource grid (e.g., as illustrated in FIG. 3). In some embodiments, an input into the one or more NN models may include a positional encoding data characterizing positions of the TX data symbols within the resource grid relative to at least some of the plurality of TX pilot symbols. For example, the positional encoding data may include relative distances from the TX data symbols to one or more closest stream-dependent pilot symbols (e.g., as described in conjunction with FIG. 3).

In some implementations, the positional encoding data may depend not only on the relative distances from the TX data symbols and the one or more pilot symbols but may depend on individual coordinates of the TX data symbols and one or more pilot symbols (absolute position encoding). The distances may be counted along a subcarrier dimension of the resource grid, a symbol dimension of the resource grid, or both. In some implementations, the positional encoding data may use sine and cosine functions to generate positional encoding data. In some implementations, the positional encoding data may include a learnable bias encoding that maps the relative distance R of the TX data symbols and TX pilot symbols to a value b=$f$(R), where $f$(R) is a suitable function (e.g., defined via a look-up table). This mapping may be learned during training and can be either a scalar or vector-valued function. In some implementations, the positional encoding data may include an ALiBi encoding that is similar to the relative bias encoding but with negative sign. In some implementations, the function $f$(R) may map distances larger than a threshold distance to the same value. In some implementations, the positional encoding data may include rotary position encoding that includes a position-dependent rotation to generate the positional encoding data. The above examples are intended as a way of illustration and not limitation and various other positional encoding data may be used in addition to or instead of the above examples.

In some embodiments, the input into the one or more NN models may further include a channel state estimate (e.g., $H_{n_f n_s}(n_R, n_T)$). The channel state estimate may relate the plurality of RX signals to the plurality of TX data symbols. In some embodiments, the channel state estimate may be obtained using a subset of the plurality of RX signals corresponding to the TX pilot symbols (e.g., values $y_{n_f n_s}(n_R)$, as described in conjunction with FIG. 2). In some embodiments, the input into the one or more NN models may also include a noise power estimate of a noise present in the plurality of RX signals.

In some embodiments, operations of block 620 may be performed as illustrated in the callout portion of FIG. 6. More specifically, processing the plurality of RX signals using the one or more NN models may include, at block 622, generating, using an initialization stage (e.g., initialization stage 210 illustrated in FIG. 2 and FIG. 4A) of the one or more NN models, a plurality of initial state tensors 220-$k$. Each initial state tensor of the plurality of initial state tensors may be associated with a respective TX stream of the plurality of TX streams. In some embodiments, the initialization stage may include one or more convolutional neuron layers (e.g., as described in conjunction with FIG. 4A).

At block 624, method 600 may include using the one or more NN models to obtain, for each TX stream of the plurality of TX streams, an inter-stream interference feature (e.g., $m_{n_f n_s}(n_T \to n'_T)$ or $M_{n_f n_s}(n_T)$). The inter-stream interference feature may be obtained using the plurality of the initial state tensors and may characterize a degree to which a corresponding TX stream is affected by other TX streams of the plurality of TX streams. In some embodiments, obtaining the inter-stream interference features for the plurality of TX streams may include processing the plurality of the initial state tensors using one or more dense neuron layers (e.g., as disclosed in conjunction with FIG. 4B).

At block 626, method 600 may include using a state update stage of the one or more NN models to iteratively update the plurality of initial state tensors (e.g., as disclosed in conjunction with FIG. 2). More specifically, an input into a first state update iteration may include the plurality of the initial state tensors $S_0(n_T)$, and an input (e.g., $S_j(n_T)$) into an n+1st state update iteration may be based on an output of an nth state update iteration. Various additional inputs may also be used in conjunction with $S_j(n_T)$, such as positional encoding, inter-stream interference features, and/or the like. In some embodiments, the state update stage may include one or more convolutional neuron layers (e.g., as disclosed in conjunction with FIG. 5A). In some embodiments, each state update iteration may be performed separately (e.g., sequentially, in parallel, or as some combination thereof) for different TX streams of the plurality of TX streams.

At block 628, method 600 may include generating, using a readout stage of the one or more NN models, probabilities for bit values of the plurality of TX symbols. In some embodiments, the readout stage of the one or more NN models may include one or more dense neuron layers (e.g., as disclosed in conjunction with FIG. 5B).

In some embodiments, the plurality of TX streams may have a first number of streams (e.g., $N_T$ TX streams) whereas the one or more NN models are trained to process a plurality of training TX data symbols transmitted via a plurality of training TX streams having a second number of streams (e.g., $N_T$) different from the first number of streams.

Inference and Training Logic

Figure 7A:
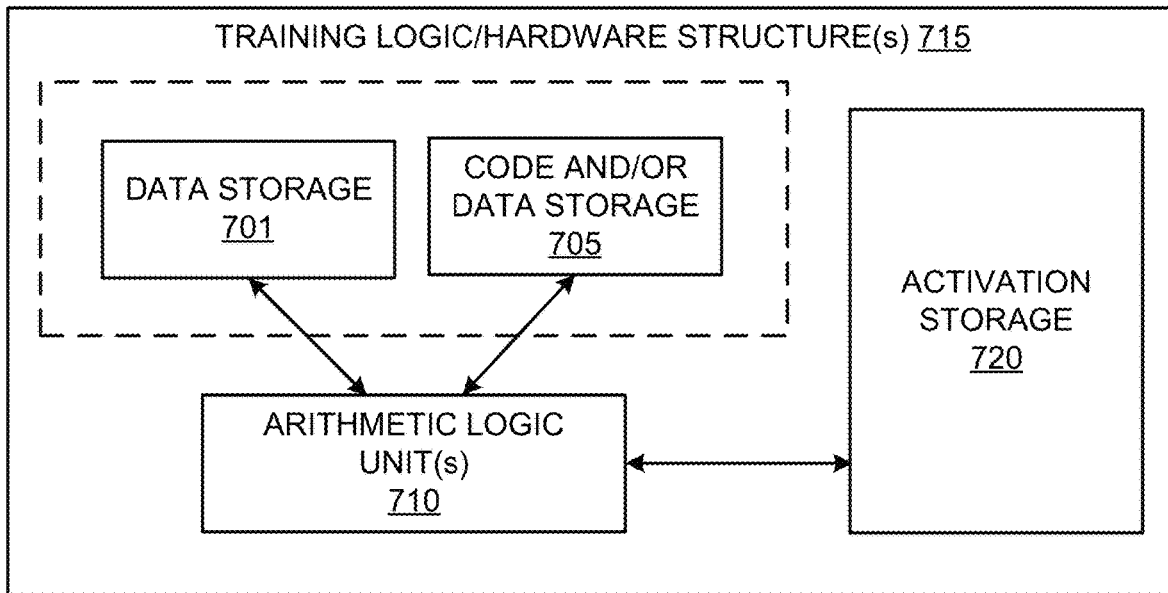
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating-point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating-point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
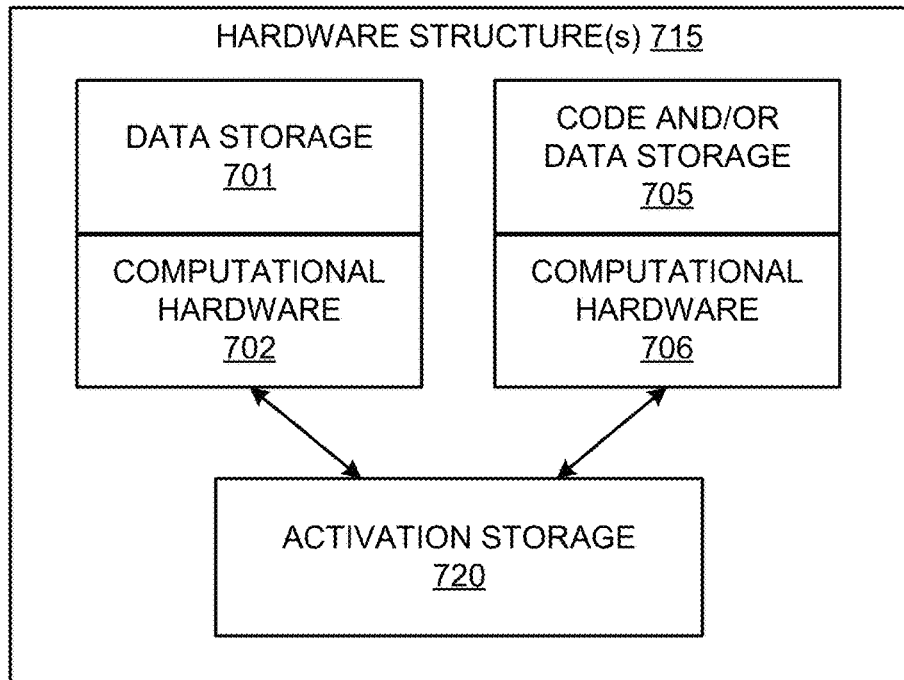
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
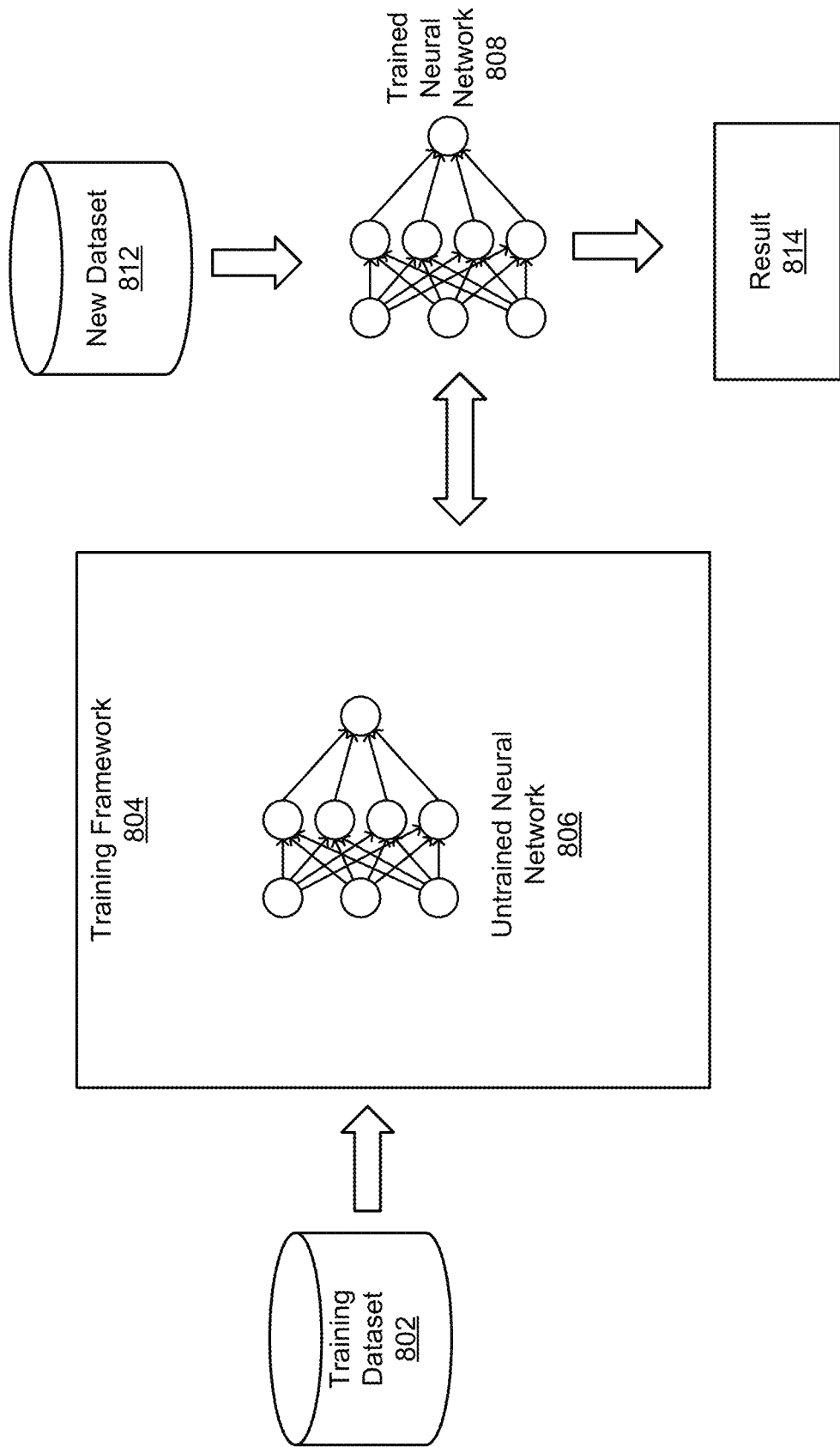
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
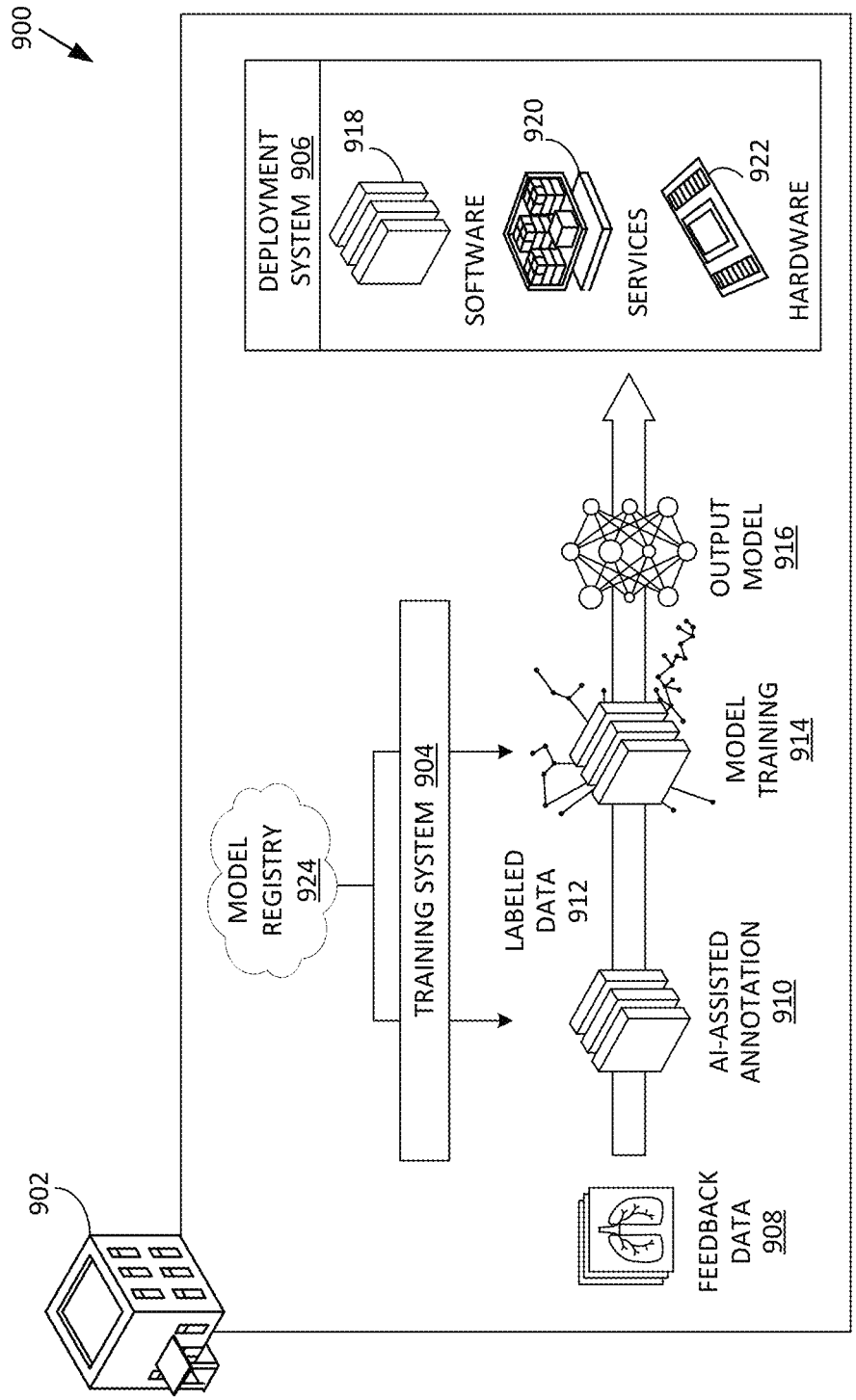
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
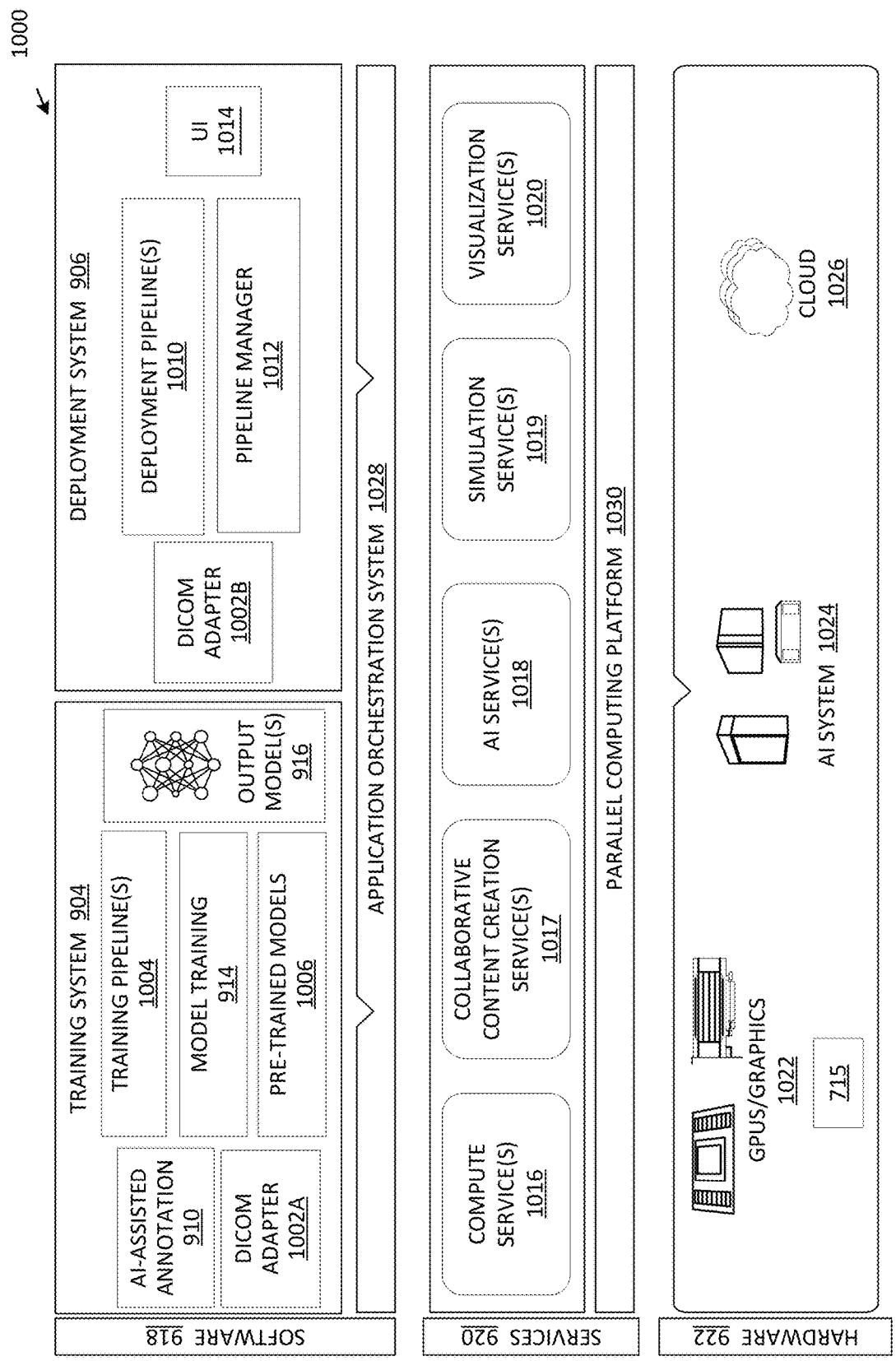
FIG. 10 is a system diagram for an example system for training, adapting, instantiating, and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LS™, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, via a plurality of receiving (RX) antennas, a plurality of RX signals, each RX signal received over a respective resource element (RE) of a resource grid of REs, wherein an individual RE of the resource grid is associated with (i) a respective radio subcarrier of a plurality of radio subcarriers and (ii) a respective data symbol of a plurality of data symbols, and wherein the plurality of RX signals comprises a combination of a plurality of transmitted (TX) streams; and
   processing the plurality of RX signals using one or more neural network (NN) models to determine a plurality of TX data symbols transmitted via the plurality of TX streams, wherein the plurality of TX data symbols comprises a plurality of TX pilot symbols transmitted at predetermined RE positions of the resource grid, wherein an input into the one or more NN models comprises a positional encoding data characterizing of the TX data symbols within the resource grid relative to at least some of the plurality of TX pilot symbols.

2. The method of claim 1, wherein the positional encoding data characterizing positions of the TX data symbols within the resource grid comprises relative distances from the TX data symbols to one or more closest stream-dependent pilot symbols along at least one of:
   a subcarrier dimension of the resource grid, or
   a symbol dimension of the resource grid.

3. The method of claim 1, wherein the positional encoding data comprises at least one of:
   an absolute position encoding,
   a learnable position encoding,
   a relative position encoding,
   a rotational position encoding, or
   an ALiBi encoding.

4. The method of claim 1, wherein the input into the one or more NN models further comprises at least one of:
   a channel state estimate, wherein the channel state estimate relates the plurality of RX signals to the plurality of TX data symbols, and wherein the channel state estimate is obtained using a subset of the plurality of RX signals corresponding to the TX pilot symbols, or
   a noise power estimate of a noise present in the plurality of RX signals.

5. The method of claim 1, wherein processing the plurality of RX signals using the one or more NN models comprises:
   generating, using an initialization stage of the one or more NN models, a plurality of initial state tensors, wherein each initial state tensor of the plurality of initial state tensors is associated with a respective TX stream of the plurality of TX streams.

6. The method of claim 5, wherein processing the plurality of RX signals using the one or more NN models further comprises:
   for each TX stream of the plurality of TX streams, obtaining, using the plurality of the initial state tensors, an inter-stream interference feature characterizing a degree to which a corresponding TX stream is affected by other TX streams of the plurality of TX streams.

7. The method of claim 6, wherein obtaining the inter-stream interference features for the plurality of TX streams comprises processing the plurality of the initial state tensors using one or more dense neuron layers.

8. The method of claim 5, wherein processing the plurality of RX signals using the one or more NN models further comprises:
   using a state update stage of the one or more NN models to iteratively update the plurality of initial state tensors, wherein an input into a first state update iteration comprises the plurality of the initial state tensors, and wherein an input into an n+1th state update iteration is based on an output of an nth state update iteration aggregated across the plurality of TX streams using a permutation-invariant aggregation function.

9. The method of claim 8, wherein the method is performed as part of training of the one or more NN models, and wherein the method further comprises:
   updating a loss function using an output of each state update iteration; and
   using the loss function to modify parameters of the one or more NN models.

10. The method of claim 8, wherein at least one of the initialization stage or the state update stage comprises one or more convolutional neuron layers.

11. The method of claim 8, wherein each state update iteration is performed separately for different TX streams of the plurality of TX streams.

12. The method of claim 1, wherein processing the plurality of RX signals using the one or more NN models further comprises:
   generating, using a readout stage of the one or more NN models, probabilities for bit values of the plurality of TX symbols.

13. The method of claim 12, wherein the readout stage of the one or more NN models comprises one or more dense neuron layers.

14. The method of claim 1, wherein the plurality of TX streams has a first number of streams, wherein the resource grid comprises a first number of radio subcarriers and a first number of data symbols, wherein the one or more NN models were trained to process a plurality of training TX data symbols transmitted via a plurality of training TX streams having a second number of streams and a training resource grid comprising a second number of radio subcarriers and a second number of data symbols, and wherein, at least:

the first number of streams is different from the second number of streams, the first number of radio subcarriers is different from the second number of subcarriers, or the first number of data symbols is different from the second number of data symbols.

15. The method of claim 1, wherein the one or more NN models are trained using the plurality of TX data symbols comprises:

a known set of TX data symbols, or an unknown set of TX data symbols reconstructed using one or more maximum-likelihood algorithms.

16. A system comprising:

a plurality of receiving (RX) antennas to receive a plurality of RX signals, each RX signal received over a respective resource element (RE) of a resource grid of REs, wherein an individual RE of the resource grid is associated with (i) a respective radio subcarrier of a plurality of radio subcarriers and (ii) a respective data symbol of a plurality of data symbols, and wherein the plurality of RX signals comprises a combination of a plurality of transmitted (TX) streams; and a processing device to process the plurality of RX signals using one or more neural network (NN) models to determine a plurality of TX data symbols transmitted via the plurality of TX streams, wherein the plurality of TX data symbols comprises a plurality of TX pilot symbols transmitted at predetermined RE positions of the resource grid, wherein an input into the one or more NN models comprises a positional encoding data characterizing positions of the TX data symbols within the resource grid relative to at least some of the plurality of TX pilot symbols.

17. The system of claim 16, wherein the input into the one or more NN models further comprises at least one of:

a channel state estimate, wherein the channel state estimate relates the plurality of RX signals to the plurality of TX data symbols, and wherein the channel state estimate is obtained using a subset of the plurality of RX signals corresponding to the TX pilot symbols, or a noise power estimate of a noise present in the plurality of RX signals.

18. The system of claim 16, wherein to process the plurality of RX signals, the processing device is to:

generate, using an initialization stage of the one or more NN models, a plurality of initial state tensors, wherein each initial state tensor of the plurality of initial state tensors is associated with a respective TX stream of the plurality of TX streams, and for each TX stream of the plurality of TX streams, obtain, using the plurality of the initial state tensors, a inter-stream interference feature characterizing a degree to which a corresponding TX stream is affected by other TX streams of the plurality of TX streams.

19. The system of claim 18, wherein to process the plurality of RX signals, the processing device is further to:

use a state update stage of the one or more NN models to iteratively update the plurality of initial state tensors, wherein an input into a first state update iteration comprises the plurality of the initial state tensors, and wherein an input into an n+1th state update iteration is based on an output of an nth state update iteration.

20. The system of claim 16, wherein to process the plurality of RX signals, the processing device is further to:

generate, using a readout stage of the one or more NN models, probabilities for bit values of the plurality of TX symbols.

21. A wireless communication system comprising:

a plurality of transmitting (TX) antennas to transmit a plurality of TX streams;

a plurality of receiving (RX) antennas to receive a plurality of RX signals, each RX signal received over a respective resource element (RE) of a resource grid of REs, wherein an individual RE of the resource grid is associated with (i) a respective radio subcarrier of a plurality of radio subcarriers and (ii) a respective data symbol of a plurality of data symbols, and wherein the plurality of RX signals comprises a combination of a plurality of transmitted (TX) streams; and a processing device to process the plurality of RX signals using one or more neural network (NN) models to determine a plurality of TX data symbols transmitted via the plurality of TX streams, wherein the plurality of TX data symbols comprises a plurality of TX pilot symbols transmitted at predetermined RE positions of the resource grid, wherein an input into the one or more NN models comprises a positional encoding data characterizing positions of the TX data symbols within the resource grid relative to at least some of the plurality of TX pilot symbols.

* * * * *